United States Patent [19]

Matlack

[11] 4,277,372

[45] Jul. 7, 1981

[54] SOLID CATALYST COMPONENT FOR OLEFIN POLYMERIZATION

[75] Inventor: Albert S. Matlack, Hockessin, Del.

[73] Assignee: Hercules Incorporated, Wilmington, Del.

[21] Appl. No.: 110,563

[22] Filed: Jan. 9, 1980

[51] Int. Cl.$^3$ .............................................. C08F 4/64
[52] U.S. Cl. ........................ 252/429 B; 252/429 C; 526/125
[58] Field of Search ................... 252/429 B, 429 C; 423/498

[56] References Cited

U.S. PATENT DOCUMENTS

| | | | |
|---|---|---|---|
| 4,022,958 | 5/1977 | Matsuura et al. | 252/429 C X |
| 4,120,820 | 10/1978 | Birkelbach | 252/429 B |
| 4,144,390 | 3/1979 | Derroitte et al. | 252/429 C X |
| 4,170,568 | 10/1979 | Kirkwood | 252/429 B X |
| 4,186,107 | 1/1980 | Wagner | 252/429 B |

Primary Examiner—Patrick Garvin
Attorney, Agent, or Firm—John W. Whitson

[57] ABSTRACT

The transition metal component of a Ziegler-Natta catalyst is composed of a titanium halide deposited on a magnesium chloride support. The support is prepared by a process involving reaction of a magnesium alkanoate with an alkylaluminum dichloride in a hydrocarbon solvent and treatment of the magnesium chloride particles formed in the reaction with a hydrocarbon solvent and with an electron donor, preferably an aliphatic ether.

9 Claims, No Drawings

SOLID CATALYST COMPONENT FOR OLEFIN POLYMERIZATION

This invention relates to a 1-olefin polymerization catalyst component composed of a titanium halide deposited on a magnesium chloride support. More particularly, it relates to a process for preparing an improved magnesium chloride support which, upon treatment with a titanium halide, provides a superior catalyst component for use in the polymerization of 1-olefins.

As is well known in the art, effective catalysts for the polymerization of 1-olefins are the Ziegler-Natta catalysts obtained by combining transition metal compounds of Groups IVb to VIb of the periodic table with organometallic compounds of Groups I to III of the table. It also is known that these catalysts can be made even more effective by depositing the transition metal component on an inorganic compound as a support.

Representative of the supports shown in the art are the magnesium and titanium oxides, aluminum silicate, magnesium carbonate, magnesium chloride, magnesium hydroxide and alkoxides, and complex oxides of magnesium and aluminum. These solid supports usually require activation either prior to or following deposition of the transition metal compound on the support, activation generally being accomplished by ball milling or by calcination. As a consequence, it has been difficult to control the particle size of the solid support and to obtain sufficient catalytic activity and mileage from the transition metal compound that the catalyst need not be removed from the polyolefin product.

Further known to the art is the utilization of dialkylmagnesium compounds and alkylaluminum halides in the preparation of 1-olefin polymerization catalysts. For example, it is known to effect reaction between diethylaluminum chloride and di-n-butyl magnesium in hydrocarbon solution whereby a precipitate of magnesium chloride is formed. However, to the resulting reaction mixture there then is added a molar excess, based on the magnesium chloride, of a titanium halide such as titanium tetrachloride and the final reaction mixture, in which all of the titanium tetrachloride has been reduced to titanium trichloride, is used as such in the polymerization of an olefin such as ethylene or propylene. There is no separation of the intermediately precipitated magnesium chloride particles and, consequently, no subsequent treatment of the separated particles.

More recently, however, it has been shown in the copending application of Klaus P. Wagner, Ser. No. 896,279, filed Apr. 14, 1978 and now U.S. Pat. No. 4,186,107, that an improved support for the transition metal compound of a Ziegler-Natta catalyst can be prepared by contacting a hydrocarbon solution of a dialkylmagnesium with a hydrocarbon solution of an alkylaluminum chloride at a temperature of from about −65° C. to about 30° C., thereby forming a suspension in the hydrocarbon of magnesium chloride particles having a particle size ranging from about 0.05 to about 80 microns, isolating the magnesium chloride particles, successively washing these particles with fresh hydrocarbon until the particles are substantially free of chloride and residual aluminum compounds and contacting said particles with an electron donor either before or after said particles are successively washed with the hydrocarbon. It is also shown that the electron donor treatment may be carried out in an alternative manner.

Now, in accordance with the present invention, it has been found that the magnesium chloride particles of the Wagner process are advantageously formed by contacting a hydrocarbon solution of a magnesium salt of an aliphatic carboxylic acid containing at least six carbon atoms with a hydrocarbon solution of a $C_2$–$C_{20}$ alkylaluminum dichloride at a temperature of from about 10° C. to about 100° C., the amount of alkylaluminum dichloride being sufficient to provide a mole ratio of Al:Mg of at least 2:1, preferably in the range of from 2:1 to about 10:1, more preferably from about 2.5:1 to about 4:1. The magnesium chloride particles then are isolated, subjected to several hydrocarbon washes, treated with an electron donor, washed with hydrocarbon again and contacted with a titanium halide.

As an example of this process, separate solutions of magnesium 2-ethylhexanoate and ethylaluminum dichloride in hexane are prepared such that the mole ratio of Al:Mg is 3:1. The two solutions are then brought into contact with each other, with stirring, over a period of about three hours and at a temperature of about 20° C. The resulting white slurry of magnesium chloride particles is stirred for an additional period of about two hours, after which the slurry is centrifuged and the magnesium chloride particles are washed several times with hexane before being resuspended in hexane. The suspended particles then are treated with a controlled amount of di-n-butyl ether, for example, for about half an hour at a temperature of about 20° C. After centrifuging, the particles are washed several times with hexane, the washed particles are suspended in fresh hexane and then contacted with titanium tetrachloride, for example, to form the transition metal component of the 1-olefin polymerization catalyst.

Now, having generally outlined the embodiments of this invention, the following examples constitute specific illustrations. All amounts are as given in the examples, and all operations were carried out in an inert atmosphere.

EXAMPLE 1

Support Preparation

A 500 ml. four-necked, round-bottomed flask was equipped with a mechanical stirrer, two pressure-equalized dropping funnels, a thermometer, an argon inlet, an argon outlet and a bubbler. All components of the apparatus were dried and purged with argon. An argon atmosphere was provided throughout the reaction. The flask was charged with 100 ml. of hexane. One dropping funnel was charged with 113 ml. of a 0.266 molar solution of magnesium 2-ethylhexanoate (30 millimoles) in an approximately 50:50 by volume admixture of hexane and an 85 aliphatic:15 cycloaliphatic hydrocarbon mixture having a boiling point range of about 175° to 190° C. To the solution of magnesium 2-ethylhexanoate in the dropping funnel was added 0.28 g. of poly(2-ethylhexyl acrylate) dissolved in one milliliter of toluene, and the solutions were mixed with a spatula under argon. The other dropping funnel was charged with 23 ml. of a 3.1 molar solution of ethylaluminum dichloride (71 millimoles) in heptane, followed by 90 ml. of hexane. The contents of the two dropping funnels were added at equal rates to the hexane in the flask over a period of three hours while stirring the reaction mixture at 260 r.p.m. The aluminum to magnesium mole ratio in the reaction mixture was 2.4:1.

After stirring the reaction mixture for an additional 2.5 hours, the resulting finely-divided white slurry of magnesium chloride was washed free of unadsorbed aluminum compounds by centrifuging, decanting and resuspending the slurry five times using 75-ml. portions of toluene. After the final wash, the solid particles were resuspended in hexane to provide a slurry having a total volume of 100 ml. To 67 ml. of this hexane slurry of magnesium chloride (20 millimoles of magnesium) was added two milliliters of di-n-butyl ether (12 millimoles) and the resulting admixture was tumbled for one hour at room temperature. The white slurry then was centrifuged, the solvent decanted and the resulting solid washed four times using 50 ml. of hexane each time.

CATALYST PREPARATION

After resuspending the ether-treated particles from the above preparation to 67 ml. in hexane, 25.8 ml. of the resulting slurry (7.7 millimoles of magnesium) was agitated with 3.7 ml. of a 0.1 molar solution of ethyl benzoate (0.37 millimole) in hexane for one hour at room temperature. To the slurry then was added 2.5 ml. of a 0.3 molar solution of titanium tetrachloride (0.75 millimole) in hexane and the reaction mixture was agitated for one hour at 35° C. The resulting slurry was treated with 0.38 ml. of di-n-butyl ether (2.4 millimoles) for one hour at 35° C. and then was centrifuged, the solvent decanted and the solid washed four times using 50 ml. of hexane each time. The slurry was resuspended to 65 ml. with hexane.

POLYMERIZATION OF PROPYLENE

An 800 ml. glass polymerization vessel was charged with 400 ml. of hexane and, after sparging the vessel with argon, the hexane was sparged with propylene at room temperature and atmospheric pressure. The total pressure was then adjusted to 5 p.s.i.g. with propylene while 0.35 millimole of triethylaluminum, 0.1 millimole of ethyl anisate and 0.64 millimole of trichlorosilane were added to the polymerization vessel, followed by 3.5 ml. of the catalyst (0.008 millimole of titanium) prepared as above. After a prepolymerization period of 10 minutes, the temperature was raised to 60° C. and the total pressure was adjusted to 37 p.s.i.g. with propylene. Propylene was continuously added to the reaction mixture for three hours to maintain the pressure at 37 p.s.i.g. (2.63 atmospheres partial pressure of propylene), after which the addition of propylene was discontinued and the system was reacted down for 15 minutes.

The white powdery polypropylene product was filtered while hot, washed once with 150 ml. of fresh hexane which was at room temperature, and dried. It was determined that the polypropylene product was obtained at an average rate of 1010 g. of diluent insoluble polypropylene per millimole of titanium per atmosphere of propylene per hour. The mileage was 8000 g. of diluent insoluble polypropylene per millimole of titanium. The polymer product contained 92.9% of diluent insoluble polymer and the latter contained 7.5% of decahydronaphthalene solubles as determined by recrystallization of the diluent insoluble polymer from decahydronaphthalene. The polymer product had a bulk density of 0.31 g./cc. The particle size distribution of the product was:

| Mesh Size: | On 20 | 40 | 60 | 80 | 100 | 200 | Through 200 |
|---|---|---|---|---|---|---|---|
| Weight % | 5.3 | 59.8 | 30.3 | 2.5 | 1.2 | 0.7 | 0.2 |

The procedure of Example 1 was essentially duplicated, with two exceptions. Instead of the poly(2-ethylhexyl acrylate) of Example 1, there was used, in preparation of the support, 0.92 g. of poly(methylhydrogen siloxane) dissolved in 2.4 milliliters of hexane. Also, in the propylene polymerization, the trichlorosilane of Example 1 was omitted from the activator composition. The polymer product contained 89.2% of diluent insoluble polymer and had a bulk density of 0.29 g./cc. As defined in Example 1, the rate was 1220 and the mileage was 9600. The particle size distribution of the polymer was:

| Mesh Size: | On 20 | 40 | 60 | 80 | 100 | 200 | Through 200 |
|---|---|---|---|---|---|---|---|
| Weight % | 3.0 | 43.6 | 31.7 | 9.9 | 5.9 | 1.0 | 5.0 |

EXAMPLE 3

Support Preparation

Following generally the procedure of Example 1, a 500 ml. flask was charged with 50 ml. of hexane, one dropping funnel was charged with 100 ml. of a 0.348 molar solution of magnesium 2-ethylhexanoate (35 millimoles) in hexane, and to the other dropping funnel was added 30 ml. of a 3.0 molar solution of ethylaluminum dichloride (90 millimoles) in hexane, followed by 60 ml. of hexane. The contents of the two dropping funnels were added simultaneously to the hexane in the flask over a period of two hours with stirring. The aluminum to magnesium mole ratio was 2.6:1.

The precipitated magnesium chloride particles were separated from the hexane by decantation and then washed two times using 100-ml. portions of hexane. After resuspension of the washed particles to 180 ml. in hexane, 1.5 ml. of diisoamyl ether (7.5 millimoles) was added and the resulting slurry was stirred for 20 minutes at room temperature. Following decantation of the supernatant liquid and washing once with 100 ml. of hexane, the particles were again resuspended to 180 ml. in hexane.

CATALYST PREPARATION

The suspended particles from the above preparation were treated with six milliliters of a 0.24 molar solution of titanium tetrachloride (1.44 millimoles) in hexane, and the resulting slurry was stirred for 30 minutes at room temperature. After decantation of the supernatant liquid and one washing with 100 ml. of hexane, the particles were resuspended to 180 ml. in hexane, and 1.5 milliliters of diisoamyl ether (7.5 millimoles) was added to the slurry, which was stirred for 20 minutes at room temperature. The slurry particles were allowed to settle, the hexane solvent was decanted, and the particles were washed twice using 100 ml. of hexane each time. The washed particles were resuspended to 180 ml. in hexane.

POLYMERIZATION OF PROPYLENE

A one-gallon, stainless steel reactor was charged with 2500 ml. of hexane. After sparging with argon, the hexane was sparged with propylene at room temperature and atmospheric pressure. After adjusting the temperature to 30° C. and the propylene pressure to 10 p.s.i.g., there were added to the reactor, with stirring, 1.8 ml. of a 1.54 molar solution of triethylaluminum (2.77 millimoles) in hexane, 3.8 ml. of a 0.2 molar solution of methyl p-toluate (0.76 millimoles) in hexane and 16.5 ml. (0.055 millimoles of titanium) of the catalyst slurry (approximately 0.003 molar in titanium) from the preceding preparation. The addition of these three components provided a ratio of aluminum to titanium of 50:1, a ratio of aluminum to methyl p-toluate of 3.64:1 and a ratio of methyl p-toluate to titanium of 13.8:1 in the reaction mixture.

After addition of the catalyst slurry, stirring was momentarily interrupted to permit addition of 9.45 millimoles of hydrogen. Stirring was then renewed and the propylene pressure was raised to 45 p.s.i.g. Over a period of seven minutes, the temperature of the reaction mixture was increased to 70° C. during which time no propylene was fed to the reactor. The propylene feed was then resumed and the polymerization was conducted at 70° C. and 75 p.s.i.g. propylene pressure for a period of three hours, after which the addition of propylene was discontinued, the reactor was cooled and vented and the reaction mixture was discharged and filtered while hot.

Analysis showed the presence of 55.5 g. of soluble polymer in the filtrate. The insoluble polymer recovered from the filtration amounted to 847.3 g., this representing a 93.8% yield of diluent insoluble polymer. Recrystallization of the latter from decahydronaphthalene showed the presence of 8.5% solubles. As defined in Example 1, the rate was 1021 and the mileage was 15,400. The bulk density of the diluent insoluble polymer was 0.391, and the particle size distribution was:

| Mesh Size: | On 20 | 40 | 60 | 80 | 100 | 200 | Through 200 |
|---|---|---|---|---|---|---|---|
| Weight % | 2.8 | 49.1 | 39.0 | 5.2 | 1.7 | 0.35 | 1.74 |

EXAMPLE 4

The procedure of Example 3 was duplicated except to provide the polymerization reaction mixture with 0.030 millimoles of titanium instead of 0.055 millimoles, thus establishing a ratio of aluminum to titanium of 92:1 instead of 50:1. Analysis showed the presence of 36.6 g. of soluble polymer in the filtrate. The insoluble polymer recovered from the filtration amounted to 710 g., this representing a 95.1% yield of diluent insoluble polymer. Recrystallization of the latter from decahydronaphthalene showed the presence of 9.4% solubles. As defined in Example 1, the rate was 1580 and the mileage was 23,667. The bulk density of the diluent insoluble polymer was 0.39, and the particle size distribution was:

| Mesh Size: | On 20 | 40 | 60 | 80 | 100 | 200 | Through 200 |
|---|---|---|---|---|---|---|---|
| Weight % | 3.9 | 8.5 | 78.8 | 6.9 | — | 0.83 | 1.1 |

EXAMPLE 5

The procedure of Example 3 again was duplicated except to provide the polymerization reaction mixture with 0.031 millimoles of titanium, 3.75 millimoles of aluminum and 0.64 millimoles of methyl p-toluate. Consequently, the ratio of aluminum to titanium was 121:1, the ratio of aluminum to methyl p-toluate was 5.86:1 and the ratio of methyl p-toluate to titanium was 20.6:1 in the reaction mixture. Also, the polymerization was run for 1.3 hours instead of three. The amount of soluble polymer in the filtrate was 93.9 g., the amount of diluent insoluble polymer was 814 g., representing a yield of 89.6%, the amount of decahydronaphthalene solubles was 6.7% and the bulk density was 0.38. The rate was 4055 and the mileage was 26,258. The particle size distribution was:

| Mesh Size: | On 20 | 40 | 60 | 80 | 100 | 200 | Through 200 |
|---|---|---|---|---|---|---|---|
| Weight % | 17.2 | 69.8 | 11.8 | 0.6 | — | 0.3 | 0.3 |

EXAMPLE 6

The procedure of Example 3 was followed in preparing precipitated magnesium chloride particles from 90 millimoles of magnesium 2,2-dimethyloctanoate and 270 millimoles of ethylaluminum dichloride, both reagents being dissolved in hexane. After wasing the precipitated particles four times with 100-ml. portions of hexane, the particles were treated with 90 millimoles of diisoamyl ether for 45 minutes at room temperature. After washing and resuspension in hexane, the particles were contacted with nine millimoles of titanium tetrachloride for 45 minutes at room temperature. The particles were then washed with hexane, resuspended in hexane and used in the polymerization of propylene in accordance with Example 3.

In so doing, the polymerization reaction mixture was provided with 0.031 millimoles of titanium, three millimoles of aluminum and 0.94 millimoles of methyl p-toluate, thus establishing a ratio of aluminum to titanium of 97:1, a ratio of aluminum to methyl p-toluate of 3.19:1 and a ratio of methyl p-toluate to titanium of 30.3:1. After 2.3 hours of polymerization, the amount of soluble polymer was 30.1 g., the amount of insoluble polymer was 589 g., representing a 95.1% yield of insoluble polymer, the amount of decahydronaphthalene solubles was 5.9% and the bulk density was 0.41. The rate was 1649 and the mileage was 19,000. The particle size distribution was:

| Mesh Size: | On 20 | 40 | 60 | 80 | 100 | 200 | Through 200 |
|---|---|---|---|---|---|---|---|
| Weight % | 4.5 | 8.1 | 67.3 | 15.9 | 3.1 | — | 1.12 |

The magnesium salts used in the process of this invention are those magnesium alkanoates which are appreciably soluble in the hydrocarbon solvents used in the process. Representative of these alkanoates are the magnesium salts of those aliphatic carboxylic acids containing six or more carbon atoms, preferably from six to about eighteen carbon atoms. These acids may be linear or branched-chain acids and, as examples of such acids which provide hydrocarbon-soluble magnesium salts, mention may be made of 2-methyl-, 3-methyl-, 2,2-dimethyl- and 2,2,4,4-tetramethyl-pentanoic acids, 2-ethyl, 2-methyl- and 3,5,5-trimethyl-hexanoic acids, 2-ethyl-2-methylbutyric acid, 2,3-dimethyl-2-isopropyl-butyric acid, 2,2-dimethylheptanoic acid, 2,2-dimethyloctanoic acid, 2,2-dimethylnonanoic acid, decanoic acid, 2,2-dimethyldecanoic acid, undecanoic acid, 2,2-dimethylundecanoic acid, dodecanoic acid, 2,2-dimethyldodecanoic acid, tridecanoic acid, 2,2-dimethyltridecanoic acid, 2,2-dimethylpentadecanoic acid, oleic acid, phenylacetic acid, 4-cyclohexylphenylacetic acid, alpha-cyclopentylphenylacetic acid, 3-cyclohexyl-, 3-cyclopentyl- and 3-phenyl-propionic acids, 2-, 3- and 4-cyclohexyl- and phenyl-butyric acids and 5-cyclohexyl- and phenyl-pentanoic acids. Mixtures of these acids may be used in the formation of the hydrocarbon-soluble magnesium alkanoates.

The alkylaluminum dichlorides used in accordance with this invention have the formula $RAlCl_2$, wherein R is a $C_2$–$C_{20}$ alkyl group. The alkyl group may, for example, be ethyl, n-propyl, isopropyl, n-butyl, isobutyl, sec-butyl, tert-butyl, n-amyl, isoamyl, n-hexyl, n-heptyl, n-octyl, n-decyl or n-dodecyl. Specific compounds corresponding to the preceding formula are ethylaluminum dichloride, butylaluminum dichloride and hexylaluminum dichloride. The corresponding dialkylaluminum chlorides are not nearly as effective as the alkylaluminum dichlorides in the process of this invention.

The hydrocarbons used as solvents in the reaction between the magnesium alkanoate and the alkylaluminum dichloride may be any liquid hydrocarbon or mixtures thereof. Representative hydrocarbons are the $C_5$–$C_{12}$ aliphatic hydrocarbons, the $C_5$–$C_{12}$ cycloaliphatic hydrocarbons, the $C_6$–$C_{12}$ monocyclic aromatic hydrocarbons or mixtures of any of these hydrocarbons. The preferred hydrocarbons are the $C_5$–$C_{12}$ aliphatic hydrocarbons and the $C_6$–$C_{12}$ monocyclic aromatic hydrocarbons. These same hydrocarbons also are used as the diluents in washing the isolated magnesium chloride particles and in the suspensions of said particles used in the preparation of the supported titanium halide catalyst component. Selection of the particular hydrocarbon to use depends primarily upon its performance in any given step in the process. Representative of the aliphatic hydrocarbon solvents are pentane, hexane, heptane and octane. Representative of the cycloaliphatic hydrocarbons are cyclopentane, cyclohexane and decahydronaphthalene, and exemplary of the aromatic hydrocarbons are benzene, toluene and xylene.

The reaction between the magnesium alkanoate and the alkylaluminum dichloride should always be carried out under an atmosphere of an inert gas such as nitrogen or argon and is best carried out by simultaneously adding the hydrocarbon solution of the alkylaluminum dichloride and the hydrocarbon solution of the magnesium alkanoate to a hydrocarbon reaction medium. Better control of the reaction is obtained than when either of the reactants is added to the other. Regardless of the mode of addition of the reactants, the aluminum to magnesium mole ratio should be at least 2:1, preferably from 2:1 to about 10:1, and more preferably from about 2.5:1 to about 4:1. The ratio of Al:Mg is critical in that, if the ratio is appreciably less than 2:1, for example, is from 1:1 to 1.8:1, the resulting catalyst is unsatisfactory in that it has insufficient activity in the polymerization of 1-olefins. The reaction of the alkanoate and the dichloride ordinarily is effected at a temperature in the range of from about 10° C. to about 100° C., preferably from about 20° C. to about 50° C. Lower temperatures, for example, 0° C. to 5° C., result in less favorable particle size distribution in the polypropylene product. The reaction time may be widely varied, for example, from about 0.5 to about 5 hours, but usually is from about two to about three hours.

The precipitated magnesium chloride particles may be separated from the reaction mixture by filtration or by centrifuging the reaction mixture and decanting the supernatant liquid. In some cases, the particles will readily settle from the reaction mixture and only decantation of the supernatant liquid is required to effect separation of the particles. The isolated particles are then washed a sufficient number of times with fresh hydrocarbon to substantially remove chloride ion and unadsorbed aluminum compounds. However, the washed particles may contain small residual amounts of hydroxyl and carboxyl functionalities, which are believed to assist in retaining the titanium halide when it is deposited on the support particles. For example, analysis of a typical magnesium chloride support made in accordance with the process of this invention showed the presence of 2.3 mol percent of 2-ethylhexanoic acid per magnesium.

An important step in the process of this invention, resulting in higher rates and mileages and in greater stereospecificity of the polypropylene, is that in which the magnesium chloride particles are treated with an electron donor subsequent to their precipitation and the hydrocarbon washing of the precipitated particles. The amount of electron donor used should be from about 1:10 to about 5:1, preferably from about 1:5 to about 1:1, on a molar basis relative to the amount of magnesium present, and the donor treatment ordinarily is for a period of from about 0.25 hour to about one hour at a temperature in the range of from about 20° to about 50° C.

The electron donors used in the process of this invention are ethers, esters, amines, alcohols, phenols, phosphines and sulfides. The ethers include aliphatic ethers containing four to 24 carbon atoms, such as diethyl ether, diisopropyl ether, dibutyl ether, diamyl ether, dihexyl ether and dioctyl ether, with dibutyl ether and diisoamyl ether being particularly preferred; cyclic ethers containing three or four carbon atoms such as dioxane, tetrahydrofuran and 1,3-propylene oxide; and aromatic or alkyl aromatic ethers containing seven to 15 carbon atoms such as diphenyl ether and anisole. The esters include those alkyl esters of fatty acids wherein the esters contain a total of four to 24 carbon atoms, such as ethyl acetate, propyl acetate, butyl acetate, amyl acetate, methyl butyrate and methyl oleate; and those alkyl esters of aromatic acids wherein the esters contain a total of eight to 24 carbon atoms, such as methyl benzoate, ethyl benzoate, isoamyl benzoate, ethyl anisate, ethyl toluate and dioctyl phthalate.

The amines include aliphatic primary, secondary and tertiary mono- and di-amines containing one to 12 carbon atoms, such as methylamine, diethylamine, tributylamine, methyl ethyl propyl amine, ethylene diamine and tetramethyl ethylene diamine; cyclic amines containing 4 to 6 carbons such as morpholine, pyrrolidine and piperidine; and aromatic amines containing six to 10 carbon atoms, such as aniline, pyridine and quinoline. The alcohols include aliphatic alcohols containing one to 18 carbon atoms, such as methanol, ethanol, propanol, dodecanol and octadecanol; and aromatic alcohols containing 7 to 15 carbon atoms, such as benzyl alcohol and p-methylbenzyl alcohol. The phenols include those with six to 10 carbon atoms, such as phenol, 2,6-dimethyl phenol, p-cresol and beta-naphthol. The phosphines include aliphatic trialkyl and triaromatic phosphines containing 6 to 18 carbon atoms, such as triethyl phosphine, tri-isobutyl phosphine, triphenyl phosphine, and ethyl diphenyl phosphine. The sulfides include the aliphatic sulfides containing 6 to 12 carbon atoms, such as dibutyl sulfide.

The preferred electron donors are the aliphatic ethers. These ethers appear to facilitate removal of residual unadsorbed aluminum compounds from the magnesium chloride particles, thus resulting in increased catalytic activity of the titanium compound. Further improvements provided by the ether treatment appear to be the result of coordination of the ether with the support particles and subsequently serving as an agent for fixing the titanium halide on these particles.

The titanium halides which are deposited on the magnesium chloride supports of this invention are well known, examples thereof being titanium tetrachloride, methoxytitanium trichloride, titanium tetrabromide and titanium tetraiodide. More generally, the titanium halides are characterized by the formula $TiX_n(OR)_{4-n}$, wherein R is a $C_1$-$C_{20}$ alkyl group, X is chlorine, bromine or iodine and n is 1, 2, 3 or 4. Titanium tetrachloride is preferred. Procedures for depositing the titanium halide on a solid support also are known. However, in accordance with this invention, the titanium halide is preferably added to the magnesium chloride support in a controlled, relatively small amount. The amount of titanium on the support, based on the magnesium, is generally from about one to about five mole percent. There is very little reduction of the tetravalent titanium to trivalent titanium because of the substantial removal of aluminum compounds from the magnesium chloride support by hydrocarbon washing and subsequent ether treatment of the support particles. Thus, there is little aluminum present to effect reduction of the tetravalent titanium.

The amount of tetravalent titanium halide added to the support in accordance with this invention is such that the amount of titanium does not exceed the amount of magnesium in the support on a molar basis. In actual practice, the magnesium to titanium mole ratio is in the range of from about 200:1 to about 1:1, preferably from about 80:1 to about 5:1. Nevertheless, the comparatively small amount of titanium in the catalyst is so highly active that rates and mileages are improved considerably in comparison to previously known catalysts.

In conjunction with depositing the titanium halide on the magnesium chloride support, it may be desirable to treat the support with an electron donor, more specifically, an alkyl ester of an aromatic acid wherein the ester contains a total of 8 to 24 carbon atoms, such as ethyl benzoate. This particular group of electron donor compounds exhibits the effect of increasing the stereospecificity of the titanium halide in the production of polypropylene. However, excessive amounts of these esters have an adverse effect on the activity of the titanium catalyst, and the amount of the ester must be controlled in order that the titanium to ester mole ratio lies in the range of from about 0.5:1 to about 10:1, preferably from about 2:1 to about 4:1. Both the ester treatment of the support and the deposition of the titanium halide on the support may be carried out at a temperature of from about 10° to about 100° C., preferably from about 15° to about 60° C., for a period of from about 0.25 hour to about two hours. Following deposition of the titanium halide on the support, the support particles are again washed with hydrocarbon.

The support, after treatment with the titanium halide, also may be further treated with an electron donor, preferably an aliphatic ether containing four to 24 carbon atoms. The amount of ether used may be about the same as that used in the ether treatment following precipitation and hydrocarbon washing of the magnesium chloride particles in the support preparation, but may be less or as much as five times greater. The instant ether treatment may be carried out at the same temperatures and for the same times as used in the ester and titanium halide treatments. Finally, the supported catalyst particles are thoroughly washed with fresh hydrocarbon and resuspended in hydrocarbon for use in the polymerization of 1-olefins.

The organometallic compounds of Groups I to III of the periodic table which serve as activator components in the Ziegler-Natta catalysts of 1-olefins are well known. The organoaluminum compounds are preferred, particularly the trialkyl aluminums such as triethyl aluminum, tri-n-propyl aluminum, triisopropyl aluminum, tri-n-butyl aluminum, triisobutyl aluminum, tri-n-hexyl aluminum and tri-n-decyl aluminum. These trialkyl aluminums may be used alone or as mixtures and are preferably partially complexed with an electron donor such as an organic acid ester. The preferred esters are the alkyl esters of aromatic acids wherein the esters contain a total of eight to 24 carbon atoms, such as ethyl anisate. Similarly well known are the 1-olefins which may be polymerized using Ziegler-Natta catalysts. Representative of these olefins are ethylene, propylene, 1-butene, 4-methyl-pentene-1 and 1-hexene.

What I claim and desire to protect by Letters Patent is:

1. A process for the preparation of a solid catalyst component for use in the polymerization of 1-olefins, which component is composed of a titanium halide deposited on an essentially anhydrous magnesium halide support, said process comprising the steps, carried out in an inert atmosphere, of (1) contacting a hydrocarbon solution of a magnesium salt of an aliphatic carboxylic acid containing at least six carbon atoms with a hydrocarbon solution of a $C_2$-$C_{20}$ alkylaluminum dichloride, the amount of said dichloride relative to said salt being sufficient to provide a mole ratio of Al:Mg of at least 2:1, said solutions being contacted with each other at a temperature of from about 10° C. to about 100° C., thereby forming a hydrocarbon suspension of magnesium chloride particles, (2) isolating said particles from said suspension, (3) successively washing said particles with a hydrocarbon solvent until the particles are substantially free of chloride and unadsorbed aluminum compounds, (4) contacting the washed particles with an electron donor, (5) washing the donor-treated particles with a hydrocarbon solvent, and (6) contacting the washed particles with a titanium halide, thereby effecting deposition of said titanium halide on the magnesium chloride particles, said hydrocarbon solvent being any liquid hydrocarbon or mixtures thereof, and said electron donor being selected from the group consisting of $C_4$-$C_{24}$ aliphatic ethers, $C_3$-$C_4$ cyclic ethers, $C_7$-$C_{15}$ aromatic ethers, $C_4$-$C_{24}$ alkyl esters of fatty acids, $C_8$-$C_{24}$ alkyl esters of aromatic acids, $C_1$-$C_{12}$ aliphatic amines, $C_4$-$C_6$ cyclic amines, $C_6$-$C_{10}$ aromatic amines, $C_1$-$C_{18}$ aliphatic alcohols, $C_7$-$C_{15}$ aromatic alcohols, $C_6$-$C_{10}$ phenols, $C_6$-$C_{18}$ aliphatic or aromatic phosphines and $C_6$-$C_{12}$ aliphatic sulfides.

2. The process of claim 1 wherein the Al:Mg mole ratio in step (1) is from about 2.5:1 to about 4:1.

3. The process of claim 1 wherein the magnesium salt is magnesium 2-ethylhexanoate.

4. The process of claim 1 wherein the magnesium salt is magnesium 2,2-dimethyloctanoate.

5. The process of claim 1 wherein the alkylaluminum dichloride is ethylaluminum dichloride.

6. The process of claim 1 wherein the titanium halide is titanium tetrachloride.

7. The process of claim 1 wherein the hydrocarbon is a $C_5$–$C_{12}$ aliphatic hydrocarbon.

8. The process of claim 1 wherein the electron donor is a $C_4$–$C_{24}$ aliphatic ether.

9. The process of claim 8 wherein the ether is di-n-butyl ether or diisoamyl ether.

* * * * *